United States Patent [19]

Tanimura et al.

[11] Patent Number: 5,688,897
[45] Date of Patent: Nov. 18, 1997

[54] METHOD FOR PRODUCING A STABILIZED OXYMETHYLENE COPOLYMER

[75] Inventors: Noritaka Tanimura; Yukio Tanigawa; Sumio Komatsu, all of Kurashiki, Japan

[73] Assignee: Asahi Kasei Kogyo Kabushiki Kaisha, Osaka, Japan

[21] Appl. No.: 669,541

[22] PCT Filed: Mar. 28, 1995

[86] PCT No.: PCT/JP95/00579

§ 371 Date: Jul. 10, 1996

§ 102(e) Date: Jul. 10, 1996

[87] PCT Pub. No.: WO95/27747

PCT Pub. Date: Oct. 19, 1995

[30] Foreign Application Priority Data

Apr. 7, 1994 [JP] Japan ..................... 6/069282

[51] Int. Cl.$^6$ .............................. C08G 4/00; C08G 6/00
[52] U.S. Cl. ...................... 528/242; 525/398; 525/405; 526/61; 528/241
[58] Field of Search ..................... 528/241, 242; 525/398, 405; 526/61

[56] References Cited

U.S. PATENT DOCUMENTS

| | | | |
|---|---|---|---|
| 4,458,064 | 7/1984 | Chatterjee | 528/501 |
| 4,692,290 | 9/1987 | Steele et al. | 264/101 |
| 4,751,272 | 6/1988 | Okita et al. | 525/398 |
| 5,344,911 | 9/1994 | Yamamoto et al. | 528/241 |

FOREIGN PATENT DOCUMENTS

| | | |
|---|---|---|
| 58-51014 | 11/1983 | Japan. |
| 62-129311 | 6/1987 | Japan. |
| 1444789 | 8/1976 | United Kingdom. |

*Primary Examiner*—Morton Foelak
*Attorney, Agent, or Firm*—Pennie & Edmonds

[57] ABSTRACT

The present invention provides a method for producing an oxymethylene copolymer, which comprises:

copolymerizing trioxane and a cyclic ether and/or a cyclic formal in the presence of at least one selected from the group consisting of boron trifluoride, boron trifluoride hydrate, and a coordination compound of an organic compound having an oxygen or a sulphur atom with boron trifluoride, volatilizing the residual polymerization catalyst to decrease its amount, by heating the obtained oxymethylene copolymer in an atmosphere of inert gas at or below its melting point, and/or reducing the pressure, without conducting any operation of deactivating the residual polymerization catalyst before volatilizing the residual polymerization catalyst, and stabilizing terminal moities of the oxymethylene copolymer after deactivating residual catalyst or stabilizing terminal moieties of the oxymethylene copolymer directly.

According to the present invention, an oxymethylene copolymer having excellent heat stability, which causes little smell of formaldehyde in melt molding, can be obtained by reducing the amount of residual polymerization catalyst in the oxymethylene copolymer.

6 Claims, No Drawings

METHOD FOR PRODUCING A STABILIZED OXYMETHYLENE COPOLYMER

This application is a 371 of PCT/JP95/00579 filed Mar. 28, 1995.

TECHNICAL FIELD

The present invention relates to a method for producing an oxymethylene copolymer having excellent heat stability. Particularly, the present invention relates to a method for producing an oxymethylene copolymer having excellent heat stability by volatilizing residual polymerization catalyst to decrease its amount in the oxymethylene copolymer. The residual polymerization catalyst is contained in crude oxymethylene copolymer obtained by copolymerizing trioxane and a cyclic ether and/or a cyclic formal.

BACKGROUND ART

A crude oxymethylene copolymer obtained by copolymerizing trioxane and a cyclic ether and/or a cyclic formal contains active polymerization catalyst. Therefore, after the polymerization catalyst is deactivated, terminal moieties of the oxymethylene copolymer are generally stabilized by using an extruder.

It is known to deactivate the polymerization catalyst in an aqueous solution comprising a basic substance. However, this method has as a drawback that a molecular weight of the oxymethylene copolymer decreases and the amount of unstable terminal moieties increases before terminal stabilization because water simultaneously causes decomposition of main chains of the oxymethylene copolymer during deactivation of the polymerization catalyst.

Another known deactivation method involves deactivating the polymerization catalyst by adding a basic substance to crude oxymethylene copolymer. This method is industrially preferable because the main chain of the oxymethylene copolymer does not decompose during deactivation of the polymerization catalyst and facilities can be simplified. As examples of this method, Japanese Patent Publication No. 51014/1983 discloses a method which comprises adding a tertiary phosphine compound as a deactivation agent to a crude oxymethylene copolymer and then feeding the oxymethylene copolymer to an extruder to stabilize terminal moieties. U.S. Pat. No. 4,751,272 discloses a method for deactivating the polymerization catalyst by adding a hindered amine compound to the oxymethylene copolymer after polymerization. However, in these methods, since deactivated polymerization catalyst remains in the oxymethylene copolymer, heat stability of the product deteriorates.

U.S. Pat. No. 5,344,911 discloses a method for deactivating a polymerization catalyst, which comprises conducting copolymerization by using $1\times10^{-3}$ to $1\times10^{-2}\%$ by mol of a polymerization catalyst based on a total amount of monomers, and then cooling the resultant product to below 45° C. within 30 seconds after copolymerization. However, in this method, the molecular weight of the oxymethylene copolymer decreases and the amount of unstable terminal moieties increases before terminal stabilization because water causes decomposition of main chains of the oxymethylene copolymer while the polymerization catalyst is deactivated by cooling.

DISCLOSURE OF THE INVENTION

The present inventors have made extensive and intensive studies to obtain an oxymethylene copolymer having high heat stability. As a result, they have found a method for producing an oxymethylene copolymer having high heat stability by decreasing the amount of residual polymerization catalyst contained in the oxymethylene copolymer.

That is, the present invention provides a method for producing an oxymethylene copolymer, which comprises:

copolymerizing trioxane and a cyclic ether and/or a cyclic formal in the presence of at least one polymerization catalyst selected from the group consisting of boron trifluoride, boron trifluoride hydrate, and a coordination compound of an organic compound having an oxygen or a sulphur atom with boron trifluoride to form an oxymethylene copolymer containing residual polymerization catalyst, volatilizing the residual polymerization catalyst to decrease its amount in the oxymethylene copolymer, by heating the obtained oxymethylene copolymer in an atmosphere of inert gas at or below its melting point, and/or reducing the pressure, without conducting any operation of deactivating the polymerization catalyst before volatilizing the residual polymerization catalyst and stabilizing a terminal moiety of the oxymethylene copolymer after deactivating residual polymerization catalyst or stabilizing a terminal moiety of the oxymethylene copolymer directly.

The present invention has the advantage that facilities are simple because the present invention is a simple method of volatilizing the polymerization catalyst to decrease its amount, by heating the oxymethylene copolymer in an atmosphere of inert gas and/or reducing the pressure, without conducting any operation to deactivate the polymerization catalyst. Conventional methods for deactivating the polymerization catalyst in aqueous solution containing basic substances require facilities to deactivate the polymerization catalyst and recover the basic substance. In order to remove the deactivated catalyst, a lot of energy is necessary and facilities become complicated because it is difficult to volatilize it. Because of these drawbacks, the present invention is more advantageous than the conventional method.

The present invention will be described in detail below.

In the present invention, a polymerization method to obtain an oxymethylene copolymer includes bulk polymerization methods and melt polymerization methods. A bulk polymerization method, which does not substantially use a solvent, or a semi-bulk polymerization method using 20% by weight or less of a solvent based on the amount of monomers, is preferable. In these methods, a solid polymer is obtained in the form of a powder or a block as polymerization proceeds.

In the present invention, trioxane, which is a cyclic oligomer of formaldehyde, is used as a main monomer. A cyclic ether and/or a cyclic formal are used as a comonomer. The cyclic ether and/or the cyclic formal mean a compound represented by the following general formula (1).

wherein $R_1$ to $R_4$ are different or the same, and represent a hydrogen atom, an alkyl group, a halogen-substituted methylene group or a halogen substituted oxymethylene group, $R_5$ represents a methylene group, an oxymethylene group, a methylene group substituted with an alkyl group or a halogenated alkyl group, or an oxymethylene group substituted with an alkyl group or a halogenated alkyl group in which p represents an integer 0 to 3, $R_5$ represents a divalent group represented by the formula—$(CH_2)_q$—O—$CH_2$— or —$(OCH_2CH_2)_q$—O—$CH_2$— in which p represents 1 and q is an integer of 1 to 4, the alkyl group has 1 to 5 carbon atoms, and 1 to 3 hydrogens of the alkyl group may be substituted by a halogen atom.

Representative examples of comonomers include ethylene oxide, propylene oxide, 1,3-dioxolane, 1,3,5-trioxepane, 1,4-butanediol formal, diethylene glycol formal, and epichlorohydrin diglycol formal. In the present invention, as a comonomer, a cyclic formal is preferable. Particularly, 1,3-dioxolane or 1,4-butanediol formal is preferable. These comonomers are added in an amount of 0.0002 to 0.15 mol, preferably 0.001 to 0.1 mol, per 1 mol of trioxane. In the present invention, an antioxidant may be added to the comonomer.

In the present invention, the polymerization catalyst is at least one selected from the group consisting of boron trifluoride, boron trifluoride hydrate and a coordination compound of an organic compound having an oxygen or a sulphur atom with boron trifluoride and is used in a form of gas or a solution containing a suitable organic solvent. Particularly, preferable polymerization catalysts include the coordination compound of boron trifluoride such as boron trifluoride diethylether having a boiling point of 126° C. and boron trifluoride dibutylether having a boiling point of 142° C. These polymerization catalysts are added in an amount of $0.2 \times 10^{-5}$ to $100.0 \times 10^{-5}$ mol, preferably $0.3 \times 10^{-5}$ to $10.0 \times 10^{-5}$ mol, more preferably $0.5 \times 10^{-5}$ to $5.0 \times 10^{-5}$ mol, per 1 mol of the total monomer.

As a polymerization apparatus used in the present invention, either of a batch-type polymerization apparatus or a continuous-type polymerization apparatus can be used. As the batch type-polymerization apparatus, a reaction tank with a stirrer, which is generally used, can be used. As the continuous-type polymerization apparatus, a Ko-kneader, a twin-screw-type continuous extruder, or a self-cleaning-type mixer such as a twin-paddle type continuous mixer can be used.

The polymerization temperature is in the range of 60° to 200° C., preferable 60° to 120° C. The polymerization time is not particularly limited. However, generally it is in the range of 10 seconds to 100 minutes.

An amount of unstable terminal of an oxymethylene copolymer discharged from a polymerization apparatus is preferably 3000 ppm or less. Most of a terminal of a molecular chain of the oxymethylene copolymer is stable. However, a part of the terminal having a structure of —$(OCH_2)_n$—OH, which is decomposed by heating, is unstable. When an amount of this unstable terminal part exceeds 3000 ppm, size of facilities becomes large because it is necessary that terminal stabilization is conducted plural times to stabilize the terminal completely.

In the present invention, a polymerization catalyst is volatilized to decrease its amount in the oxymethylene copolymer by heating a granular oxymethylene copolymer discharged from the polymerization apparatus in an atmosphere of inert gas at or below its melting point, and/or reducing the pressure.

It is preferable to grind the granular oxymethylene copolymer discharged from the polymerization apparatus before heating the oxymethylene copolymer and/or reducing the pressure. As a grinder, either of a batch type grinder and a continuous type grinder may be used. Grinders such as an impact-type grinder, a ball mill-type grinder, a jet mill-type grinder, and the like may be used.

The average particle diameter of the ground oxymethylene copolymer is 2 mm or less. If necessary, the oxymethylene copolymer is preferably ground into a particle having an average particle diameter of 1 mm or less. When the average particle diameter exceeds 2 mm, volatilization removal efficiency of the polymerization catalyst contained in the oxymethylene copolymer is lowered.

When an oxymethylene copolymer is heated and/or the pressure is reduced, the temperature is preferably 50° C. to its melting point, more preferably 100° to 150° C. When the temperature is low, the polymerization catalyst and impurities such as unreacted trioxane, formic acid, or an alcohol cannot be sufficiently removed. When the temperature exceeds the melting point, the copolymer is melted.

The length of time to heat an oxymethylene copolymer and/or to reduce a pressure is preferably 5 to 200 minutes, more preferably 10 to 90 minutes. When the time is short, the polymerization catalyst and the impurities cannot be sufficiently removed. When the time exceeds 200 minutes, size of an apparatus becomes large, though the polymerization catalyst and the impurities can be sufficiently removed.

If the polymerization catalyst is volatilized to reduce an amount of it by heating and/or reducing the pressure so that a content of a residual polymerization catalyst may be 10 ppm or less, an oxymethylene copolymer having higher heat stability can be preferably obtained.

Conventionally, after a polymerization catalyst is deactivated by bringing an oxymethylene copolymer into contact with a basic substance to prohibit decomposition of a main chain of the oxymethylene copolymer, which the polymerization catalyst causes, the oxymethylene copolymer is generally heated to be dry.

In the present invention, the polymerization catalyst can be volatilized to decrease its amount, by heating the oxymethylene copolymer and/or reducing the pressure, without bringing the oxymethylene copolymer into contact with a basic substance.

Since the oxymethylene copolymer obtained in this way contains a small amount of an active polymerization catalyst and an unstable terminal, the polymerization catalyst is deactivated and then the unstable terminal is stabilized, or the unstable terminal is stabilized directly.

As a method for deactivating the polymerization catalyst, a method for deactivating the polymerization catalyst by using an organic solvent and/or water containing a basic substance or a method for deactivating the polymerization catalyst by mixing a melted oxymethylene copolymer and a basic substance with a extruder can be used.

Basic substances used to deactivate a polymerization catalyst include a hydroxide of alkali metal or alkali earth metal, an inorganic weak acid salt, an organic weak acid salt, and the like. Specific examples include a hydroxide of lithium, sodium, calcium, magnesium, potassium, strontium or barium, a carbonic acid salt, a phosphoric acid salt, a silicic acid salt, a boric acid salt, a formic acid salt, an acetic acid, a stearic acid salt, a palmitic acid salt, a propionic acid salt, an oxalic acid salt, and the like. Amine compounds such as ammonia, triethylamine, and tributylamine can be also used as a deactivation agent.

Terminal stabilization of a copolymer can be conducted by a conventionally known method, for example, a method comprising conducting melted hydrolysis in the presence of a basic substance by using a vented single-screw extruder or a vented twin screw extruder.

Basic substances include ammonia and aliphatic amine compounds such as triethylamine and tributylamine. As other basic substances, there are a hydroxide of alkali metal or alkali earth metal, an inorganic weak acid salt, an organic weak acid salt and the like. Specific examples include a hydroxide of sodium, calcium, magnesium, potassium or barium, a carbonic acid salt, a phosphoric acid salt, a silicic acid salt, a boric acid salt, a formic acid salt, an acetic acid, a stearic acid salt, a palmitic acid salt, a propionic acid salt, an oxalic acid salt, and the like. Particularly, amine compounds such as ammonia, triethylamine, and tributylamine are preferable.

In case of the amine compounds to stabilize a terminal, an amount of them is 0.01 to 5% by weight based on an amount of the oxymethylene copolymer. In case of the hydroxide of alkali metal or alkali earth metal to stabilize a terminal, the inorganic weak acid salt, the organic weak acid salt and the like, an amount of them is 2 to 5000 ppm based on an amount of the oxymethylene copolymer.

In the present invention, water and/or an organic solvent can be added to a terminal stabilization zone with the basic substance.

After terminal stabilization, an unreacted monomer contained in an oxymethylene copolymer before terminal stabilization, formaldehyde produced during stabilization of a terminal moiety and the like are removed in a volatilization zone under reduced pressure and then an oxymethylene copolymer is pelletized.

In the present invention, a stabilizer to prevents decomposition, which heat, light, oxidization, or the like causes, and other additives can be added before or after the terminal stabilization zone.

According to the method for producing a stabilized oxymethylene copolymer of the present invention, an oxymethylene copolymer having excellent heat stability, which produce little formaldehyde during melt molding, can be obtained by reducing an amount of a residual polymerization catalyst.

BEST MODE FOR CARRYING OUT THE INVENTION

Hereinafter, the present invention will be described with reference to examples and comparative examples in more detail. Values in examples and comparative examples are measured as follows.

(Average particle diameter of an oxymethylene copolymer)

An oxymethylene copolymer was sifted. An average particle diameter was a particle diameter corresponding to a value of integrated weight of a oxymethylene copolymer sifted under sieves, which is 50% by weight of the total oxymethylene copolymer.

(Amount of a residual polymerization catalyst)

A concentration (ppm) of fluorine was measured with a fluorine ion meter (HORIBA N-8F) by decomposing 5 g of an oxymethylene copolymer in 15 g of 1N-hydrochloric acid.

(Amount of an unstable terminal moiety before terminal moiety stabilization)

After polymerization was completed, a part of the oxymethylene copolymer was taken out before stabilization of the terminal moiety. After the polymerization catalyst was deactivated with a aqueous solution containing 1% by weight of triethylamine, the amount (ppm) of formaldehyde produced by heating the oxymethylene copolymer in nitrogen at 200° C. for 50 minutes was absorbed in water and then was measured with titration.

(Amount of the produced aldehyde)

Formaldehyde (ppm) produced by heating an oxymethylene copolymer, after terminal moiety stabilization, in nitrogen at 230° C. for 100 minutes was absorbed in water and then was measured with titration.

(Heat stability)

A resin is placed into an injection molding machine (Arburg all rounder 100 manufactured by Western Trading) having a cylinder temperature of 230° C. and then, was molded into a molding piece of 12×10×3 mm. The time (minutes) when a silver streak occurred on the surface of the molding piece was measured.

EXAMPLE 1

A twin paddle-type continuous mixer with a jacket, through which a heat medium can be run, was controlled at 80° C. Then 12 kg of trioxane, 0.045 mol of 1,3-dioxolane per 1 mole of trioxane as a comonomer, and $0.7 \times 10^{-3}$ mol of methylal per 1 mole of trioxane as a molecular weight modifier were continuously added to the mixer. Further, as a polymerization catalyst, $2.0 \times 10^{-5}$ mol of boron trifluoride diethyletherate per 1 mol of trioxane was continuously added and then polymerization was conducted. The amount of unstable terminal moieties in the obtained oxymethylene copolymer was 1950 ppm.

The oxymethylene copolymer discharged from the mixer was ground into particles having a average particle diameter of 1 mm or less in an atmosphere of nitrogen with an impact type grinder. The ground oxymethylene copolymer was heated in a nitrogen current at 140° C. for 60 minutes and then was cooled to 50° C. in a nitrogen current in a hopper with a jacket. As a antioxidant, 0.3 part by weight of 2,2'-methylenebis(4-methyl-6-t-butylphenol) was added the cooled oxymethylene copolymer and then the oxymethylene copolymer containing the antioxidant was provided to a vented twin-screw extruder having a screw diameter of 30 mm, manufactured by IKEGAI CORPORATION. The terminal stabilization zone of the extruder was composed of kneading discs having a thickness of 0.15×(screw diameter). The length of the terminal stabilization zone was 6×(screw diameter). The screw revolution speed and temperature of the extruder were 100 rpm and 200° C. respectively. As a substance used to stabilize terminal moieties, an aqueous solution of triethylamine was used. The aqueous solution include a ratio by weight of triethylamine to water of 1 to 2. The aqueous solution was continuously added to melted oxymethylene copolymer in an amount of 3 parts by weight per 100 part by weight of the oxymethylene copolymer before the terminal stabilization zone. After the terminal stabilization zone, the oxymethylene copolymer having a stabilized terminal was subjected to volatilization treatment under a vent vacuum of 30 torr. The oxymethylene copolymer obtained from a dice part of the extruder was extruded as a strand and pelletized.

Contents of residual polymerization catalysts (concentration of fluorine) contained in oxymethylene copolymers after polymerization, after heating, and after terminal stabilization, amount of formaldehyde produced from a oxymethylene copolymer, which was after terminal moiety stabilization, and heat stability were measured. The results are shown in Table 1.

EXAMPLE 2

The same procedure as in Example 1 was conducted except that the oxymethylene copolymer (average particle diameter of 3.5 mm) discharged from the mixer was not ground. The results are shown in Table 1.

EXAMPLE 3

The same procedure as in Example 1 was conducted except that the amount of the polymerization catalyst was changed to $1.2\times10^{-5}$ mol of boron trifluoride diethyletherate per 1 mol of trioxane. The results are shown in Table 1.

EXAMPLE 4

The same procedure as in Example 1 was conducted except that the comonomer was changed to 1,4-butanediol formal. The results are shown in Table 1.

EXAMPLE 5

The same procedure as in Example 4 was conducted except that the oxymethylene copolymer (average particle diameter of 3.5 mm) discharged from the mixer was not ground. The results are shown in Table 1.

EXAMPLE 6

The same procedure as in Example 4 was conducted except that the amount of the polymerization catalyst was changed to $1.2\times10^{-5}$ mol of boron trifluoride diethyletherate per 1 mol of trioxane. The results are shown in Table 1.

EXAMPLE 7

The same procedure as in Example 1 was conducted except that after the polymerization catalyst was deactivated by stirring and mixing the heated oxymethylene copolymer with an aqueous solution containing 5% by weight of triethylamine, which is 4 times as heavy as the oxymethylene copolymer, the resultant oxymethylene copolymer was dehydrated and then dried at 140° C. for 60 minutes. The results are shown in Table 1.

EXAMPLE 8

The same procedure as in Example 1 was conducted except that the polymerization catalyst was deactivated by adding 0.03% weight of calcium hydroxide to the heated oxymethylene copolymer. The results are shown in Table 1.

COMPARATIVE EXAMPLE 1

The same procedure as in Example 1 was conducted except that grinding and heating were not conducted. The results are shown in Table 1.

COMPARATIVE EXAMPLE 2

The same procedure as in Example 1 was conducted except that after the polymerization catalyst was deactivated with an aqueous solution containing 5% by weight of triethylamine without heating the ground oxymethylene copolymer, the resultant oxymethylene copolymer was dehydrated and then dried at 140° C. for 60 minutes. The results are shown in Table 1.

INDUSTRIAL APPLICABILITY

As also clearly shown in Examples, according to the present invention, An oxymethylene copolymer having excellent heat stability, which causes low level of formaldehyde odor in melt molding, can be obtained by reducing residual polymerization catalyst in the oxymethylene copolymer.

TABLE 1

| Example and Comparative Example | Comonomer | Amount of added polymerization catalyst (mol/mol of the total monomer) | Content of polymerization catalyst in the copolymer (fluorine) (ppm) | | | Amount of produced formaldehyde (ppm) | Heat stability (min.) |
|---|---|---|---|---|---|---|---|
| | | | After polymerization | After heating | After terminal stabilization | | |
| Ex. 1 | 1,3-dioxolane | $0.20\times10^{-4}$ | 12 | 8 | 7.5 | 157 | 160 |
| Ex. 2 | 1,3-dioxolane | $0.20\times10^{-4}$ | 12 | 8.5 | 8.0 | 168 | 155 |
| Ex. 3 | 1,3-dioxolane | $0.12\times10^{-4}$ | 8 | 6 | 6.0 | 125 | 175 |
| Ex. 4 | 1,4-butanediol formal | $0.20\times10^{-4}$ | 12 | 8 | 8.0 | 162 | 155 |
| Ex. 5 | 1,4-butanediol formal | $0.20\times10^{-4}$ | 12 | 8.5 | 8.5 | 172 | 149 |
| Ex. 6 | 1,4-butanediol formal | $0.12\times10^{-4}$ | 8 | 6 | 6.0 | 127 | 171 |
| Ex. 7 | 1,3-dioxolane | $0.20\times10^{-4}$ | 12 | 8 | 7.5 | 160 | 159 |
| Ex. 8 | 1,3-dioxolane | $0.20\times10^{-4}$ | 12 | 8 | 7.5 | 158 | 158 |
| Co. Ex. 1 | 1,3-dioxolane | $0.20\times10^{-4}$ | 12 | — | 11 | 249 | 98 |
| Co. Ex. 2 | 1,3-dioxolane | $0.20\times10^{-4}$ | 12 | — | 11 | 323 | 119 |

We claim:

1. A method for producing an oxymethylene copolymer, which comprises:

copolymerizing trioxane and a cyclic ether and/or a cyclic formal in the presence of at least one polymerization catalyst selected from the group consisting of boron trifluoride, boron trifluoride hydrate and a coordination compound of an organic compound having an oxygen or a sulphur atom with boron trifluoride to form an oxymethylene copolymer containing residual polymerization catalyst, volatilizing the residual polymerization catalyst to decrease the amount thereof in said oxymethylene copolymer, by heating the obtained oxymethylene copolymer in an atmosphere of inert gas at or below its melting point, and/or reducing the pressure, without conducting any operation of deactivating the polymerization catalyst before volatilizing the residual polymerization catalyst and stabilizing terminal moieties of the oxymethylene copolymer after deactivating said residual catalyst or stabilizing terminal moieties of the oxymethylene copolymer directly.

2. The method for producing an oxymethylene copolymer according to claim 1, further comprising:

grinding said oxymethylene copolymer into particles having an average particle diameter of 2 mm or less before volatilizing the polymerization catalyst to decrease the amount thereof in said oxymethylene copolymer.

3. The method for producing an oxymethylene copolymer according to claim 1, wherein trioxane and the cyclic formal are copolymerized in the presence of a polymerization catalyst having a content of $0.5 \times 10^{-5}$ to $5.0 \times 10^{-5}$ mole per 1 mol of the total monomer and the amount of unstable terminal moieties of the oxymethylene copolymer discharged from the polymerization apparatus is 3000 ppm or less.

4. The method for producing an oxymethylene copolymer according to claim 1, wherein the cyclic ether and the cyclic formal are 1,3-dioxolane and 1,4-butanediol formal respectively.

5. The method for producing an oxymethylene copolymer according to claim 1, wherein the residual polymerization catalyst is volatilized to decrease the amount thereof in said oxymethylene, by heating the obtained oxymethylene copolymer in an atmosphere of inert gas at 50° C. to its melting point for 5 to 200 minutes and/or reducing a pressure, without condycting any operation of deactivating the polymerization catalyst before volatilizing the residual polymerization catalyst.

6. The method for producing an oxymethylene copolymer according to claim 1, wherein a content of residual polymerization catalyst in the oxymethylene copolymer after the step of volatilizing the residual polymerization catalyst to decrease its amount is 10 ppm or less in terms of fluorine concentration.

* * * * *